United States Patent
Li et al.

(10) Patent No.: US 10,547,424 B2
(45) Date of Patent: Jan. 28, 2020

(54) METHOD OF CONFIGURING CHANNEL STATE INFORMATION REFERENCE SIGNAL TRANSMITTED ON PILOT AND DEVICE UTILIZING SAME

(71) Applicant: ZTE CORPORATION, Shenzhen, Guangdong (CN)

(72) Inventors: Yong Li, Shenzhen (CN); Yu Ngok Li, Shenzhen (CN); Yijian Chen, Shenzhen (CN); Zhaohua Lu, Shenzhen (CN); Jianxing Cai, Shenzhen (CN); Hao Wu, Shenzhen (CN); Huahua Xiao, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 0 days.

(21) Appl. No.: 15/774,071

(22) PCT Filed: Oct. 24, 2016

(86) PCT No.: PCT/CN2016/103095
§ 371 (c)(1),
(2) Date: May 7, 2018

(87) PCT Pub. No.: WO2017/076181
PCT Pub. Date: May 11, 2017

(65) Prior Publication Data
US 2018/0316470 A1 Nov. 1, 2018

(30) Foreign Application Priority Data
Nov. 6, 2015 (CN) .......................... 2015 1 0752877

(51) Int. Cl.
*H04L 5/00* (2006.01)

(52) U.S. Cl.
CPC .......... *H04L 5/0048* (2013.01); *H04L 5/0007* (2013.01)

(58) Field of Classification Search
None
See application file for complete search history.

(56) References Cited

U.S. PATENT DOCUMENTS

| 2012/0201318 A1 | 8/2012 | Seo et al. |
| 2014/0198675 A1 | 7/2014 | He et al. |
| (Continued) | | |

FOREIGN PATENT DOCUMENTS

| CN | 102377531 A | 3/2012 |
| CN | 102428662 A | 4/2012 |
| (Continued) | | |

OTHER PUBLICATIONS

International Search Report and Written Opinion for PCT Appl. No. PCT/CN2016/103095, dated Feb. 6, 2017.
(Continued)

*Primary Examiner* — Brian S Roberts
(74) *Attorney, Agent, or Firm* — Foley & Lardner LLP; Christopher J. McKenna; Paul M. H. Pua

(57) ABSTRACT

The embodiments of the invention provide a method of configuring a channel state information reference signal (CSI-RS) transmitted on a pilot and a device utilizing the same. The method includes: a base station generates a signaling including configuration information of a CSI-RS; and the base station transmits the signaling including the configuration information of the CSI-RS; wherein the configuration information includes a CSI-RS port number, CSI-RS resource patterns and a CSI-RS subframe configuration; the CSI-RS resource patterns include at least one of the following: CSI-RS resource patterns transmitted on a normal downlink subframe and CSI-RS resource patterns transmit-
(Continued)

ted on a downlink pilot time slot (DwPTS). The CSI-RS subframe configuration includes a CSI-RS subframe configuration transmitted on both the DwPTS and the normal downlink subframe. The embodiments resolve a complicated problem of transmitting CSI-RS in DwPTS in a CSI-RS transmission scenario, reducing complexity of transmitting CSI-RS in DwPTS.

20 Claims, 5 Drawing Sheets

(56) References Cited

U.S. PATENT DOCUMENTS

| | | | |
|---|---|---|---|
| 2014/0226509 A1* | 8/2014 | Ko | H04B 7/0626 370/252 |
| 2015/0003271 A1* | 1/2015 | Park | H04L 5/0091 370/252 |
| 2015/0180628 A1* | 6/2015 | Kim | H04B 7/0667 370/336 |
| 2016/0094326 A1* | 3/2016 | Moon | H04L 5/0026 370/330 |

FOREIGN PATENT DOCUMENTS

| | | |
|---|---|---|
| CN | 103314614 A | 9/2013 |
| CN | 103763071 A | 4/2014 |
| EP | 3 373 498 A1 | 9/2018 |
| WO | WO 2015/133825 A1 | 9/2015 |

OTHER PUBLICATIONS

Catt, "Introduction of CSI-RS in DwPTS for TDD," 3GPP TSG-RAN WG1 Meeting #82bis, R1-155203, Malmo, Sweden, Oct. 5-9, 2015.

Extended European Search Report for European Application No. 16861449.3, dated May 15, 2019.

Huawei, Hisilicon, "CSI-RS design for 12 and 16 ports," 3GPP TSG-RAN WG1 Meeting #82, R1-153792, Beijing, China, Aug. 24-28, 2015.

Pantech, "Considerations on CSI-RS transmission in TDD special subframes," 3GPP TSG-RAN WG1 Meeting #74, R1-133444, Barcelona, Spain, Aug. 19-23, 2013.

* cited by examiner

METHOD OF CONFIGURING CHANNEL STATE INFORMATION REFERENCE SIGNAL TRANSMITTED ON PILOT AND DEVICE UTILIZING SAME

CROSS-REFERENCE TO RELATED APPLICATIONS

This application is a U.S. National Stage under 35 U.S.C. § 371 of International Patent Application No. PCT/CN2016/103095, filed on Oct. 24, 2016, which claims priority to Chinese Patent Application No. 201510752877.0, filed on Nov. 6, 2015, the contents of which are incorporated herein by reference in their entirety for all purposes.

TECHNICAL FIELD

Embodiments of the present disclosure relate to the field of communications, and in particular, to a method of configuring channel state information-reference signal (CSI-RS) transmitted on pilot and a device utilizing the same.

BACKGROUND

Long Term Evolution (LTE)/LTE-Advanced (LTE-A) is the mainstream fourth generation (4G) mobile communication technology. LTE/LTE-A is divided into the following two different duplex modes: Frequency Division Duplex (FDD) and Time Division Duplex (TDD). A frame structure of Frequency Division Duplex is referred to as Frame structure type 1, and a frame structure of Time Division Duplex is referred to as Frame structure type 2.

FIG. 1 is a schematic diagram showing Frame structure type 1 in the prior art. As shown in FIG. 1, Frame structure type 1 is illustrated as follows: each radio frame has a length of $T_f=307200 \cdot T_s=10$ ms (millisecond) and is consisted of 20 slots; each slot has a length of $T_{slot}=15360 \cdot T_s=0.5$ ms (millisecond), with Ts being a time unit, $T_s=1/(15000 \times 2048)$ second, and the slots being numbered as 0 to 19; a subframe is defined as consisted of two consecutive slots, that is, subframe i is consisted of slots 2i and 2i+1; for FDD, during the time interval of 10 milliseconds, 10 subframes are used for downlink transmission, and 10 subframes are used for uplink transmission; the uplink transmission and the downlink transmission are carried out on different frequencies respectively; in half-duplex FDD mode, a user equipment (UE, for short) cannot transmit and receive simultaneously. However, in full duplex FDD mode, there is no such restriction.

FIG. 2 is a schematic diagram showing Frame structure type 2 in the prior art. As shown in FIG. 2, Frame structure type 2 is illustrated as follows: each radio frame has a length of $T_f=307200 \cdot T_s=10$ ms and is consisted of two half-frames; each half-frame has a length of $153600 \cdot T_s=5$ ms and is consisted of 5 subframes, and each subframe has a length of $30720 \cdot T_s=1$ ms; each subframe is defined as consisted of two slots, that is, subframe i is consisted of slots 2i and 2i+1, and the length of each slot is $T_{slot}=15360 \cdot T_s=0.5$ ms, Ts being a time unit, and $T_s=1/(15000 \times 2048)$ second.

The uplink-downlink configuration of a cell changes between frames, and uplink-downlink transmission occurs on the subframes of a frame. The uplink-downlink configuration of the current frame is obtained by a high-level signaling.

Table 1 shows 7 types of uplink-downlink configurations. For each subframe in a radio frame, "D" labels a downlink subframe for downlink transmission, "U" labels an uplink subframe for uplink transmission, and "S" labels a special subframe. A special subframe has the following three regions: a downlink pilot time slot (DwPTS), a guard period (GP) and an uplink pilot time slot (UpPTS).

TABLE 1

| Uplink-downlink Configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Table 2 shows the lengths of DwPTS and UpPTS. There are totally 10 types of special subframe configurations, and the total length of GP and UpPTS is $30720 \cdot T_s=1$ ms.

It supports an uplink-downlink configuration with a downlink-to-uplink switch-point periodicity of 5 ms and 10 ms. In the case of a downlink-to-uplink switch-point periodicity of 5 ms, the special subframe lies in the two half-frames; and in the case of a downlink-to-uplink switch-point periodicity of 10 ms, the special subframe lies in the first half-frame. Subframes 0 and 5 and DwPTS are always used for downlink transmission. The subframe next to the UpPTS and the special subframe is used for uplink transmission. In the case of multi-cell or carrier aggregation, the guard period (GP) of the special subframe of a cell or a carrier employing frame structure type 2 has an overlap of at least $1456 \cdot T_s$.

TABLE 2

| | Downlink NCP | | | Extended ECP | | |
|---|---|---|---|---|---|---|
| | | UpPTS | | | UpPTS | |
| Special Subframe Configuration | DwPTS | Uplink NCP | Uplink ECP | DwPTS | Uplink NCP | Uplink ECP |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |

TABLE 2-continued

| | | Downlink NCP | | | Extended ECP | |
|---|---|---|---|---|---|---|
| | | UpPTS | | | UpPTS | |
| Special Subframe Configuration | DwPTS | Uplink NCP | Uplink ECP | DwPTS | Uplink NCP | Uplink ECP |
| 7 | 21952 · $T_s$ | | | 12800 · $T_s$ | | |
| 8 | 24144 · $T_s$ | — | — | — | — | — |
| 9 | 13168 · $T_s$ | — | — | — | — | — |

Other subframes relative to the special subframe are normal subframes, and normal subframes are partitioned into downlink normal subframes and uplink normal subframe.

In LTE/LTE-A, downlink transmission employs Orthogonal Frequency Division Multiplexing (OFDM, for short) modulation technology, and data modulation occurs on a subcarrier in the frequency domain, and then a cyclic prefix is added when switching to the time domain, thereby consisting an intact time domain transmission OFDM symbol. The cyclic prefix (CP, for short) is provided for counteracting the symbol interference generated by multipath on the time domain and the inter-subcarrier interference generated on the frequency domain. In an LTE/LTE-A system, there are CPs with two different lengths: Normal cyclic prefix (NCP, for short) and Extended cyclic prefix (ECP, for short). An Extended CP is applied in a scenario with larger multipath time-delay extension. In the case of normal CP, the inter-subcarrier period is 15 kHz; and in the case of Extended CP, there are two types of inter-subcarrier periods, i.e., 15 kHz and 7.5 kHz, respectively.

The signal transmitted on each time slot is described with one or more resource grids, and a resource grid is consisted of $N_{RB}^{DL}N_{sc}^{RB}$ subcarriers and $N_{symb}^{DL}$ OFDM symbols. $N_{RB}^{DL}$ represents the number of Physical Resource Blocks (PRBs) or Resource Blocks (RBs), $N_{sc}^{RB}$ represents the number of subcarriers in a Resource Block, and $N_{symb}^{DL}$ represents the number of OFDM symbols in a time slot. Table 3 shows the parameters of the Physical Resource Block, the number of OFDM symbols and the number of subcarriers on one RB. Table 4 shows the parameters of the OFDM symbol and the length of the cyclic prefix.

TABLE 3

| Configuration | | $N_{sc}^{RB}$ | $N_{symb}^{DL}$ |
|---|---|---|---|
| Normal Cyclic Prefix (NCP) | Δf = 15 kHz | 12 | 7 |
| Extended Cyclic Prefix (ECP) | Δf = 15 kHz | | 6 |
| | Δf = 7.5 kHz | 24 | 3 |

TABLE 4

| Configuration | | CP length $N_{CP, l}$ |
|---|---|---|
| Normal Cyclic Prefix (NCP) | Δf = 15 kHz | 160 for l = 0 |
| | | 144 for l = 1, 2, . . . , 6 |
| Extended Cyclic Prefix (ECP) | Δf = 15 kHz | 512 for l = 0, 1, . . . , 5 |
| | Δf = 7.5 kHz | 1024 for l = 0, 1, 2 |

The number of Physical Resource Blocks $N_{RB}^{DL}$ is determined by the downlink transmission bandwidth configured by the cell, with a minimum value of 6 and a maximum value of 110.

The same PRB on two successive slots on the same subframe is referred to as a PRB pair.

FIG. 3 is a schematic diagram showing a downlink resource grid in the prior art. As shown in FIG. 3, each unit in the resource grid is referred to as a resource element (RE, for short) and is labelled by an index pair (k,l), with k=0, . . . , $N_{RB}^{DL}N_{sc}^{RB}$−1, representing the subcarrier sequence number on the frequency domain, and l=0, . . . , $N_{symb}^{DL}$−1, representing the OFDM symbol sequence number on the time domain.

An antenna port is defined as a channel through which a symbol transmitted on the antenna port passes, and it may be predicted from a channel through which other symbols transmitted on the same port pass. The antenna port is further defined with a corresponding sequence number for distinguishing between the antenna ports and indexing the antenna port.

A downlink physical channel corresponds to a set of some resource elements, and it is provided for carrying the information from an upper level. Downlink physical information includes Physical Downlink Shared Channel (PDSCH, for short), Physical Multicast Channel (PMCH, for short), Physical Broadcast Channel (PBCH, for short), Physical Control Format Indicator Channel (PCFICH, for short), Physical Downlink Control Channel (PDCCH, for short), Physical Hybrid ARQ Indicator Channel (PHICH, for short) and Enhanced Physical Downlink Control Channel (EPDCCH, for short).

A Downlink Physical Signal corresponds to a set of resource elements, and it is used on the physical layer but not used for carrying the upper level information. The Downlink Physical Signal includes: Reference signal (RS), Synchronization signal and Discovery signal.

A Reference signal is also referred to as a pilot, including the following types: Cell-specific Reference Signal (CRS), Multimedia/Broadcast Single Frequency Network (MB-SFN) Reference Signal, UE-specific Reference Signal (Demodulation Reference Signal (DMRS)), Positioning reference signal and Channel State Information-reference signal (CSI-RS). Further, UE-specific reference signal has the following two types: UE-specific reference signals associated with PDSCH and UE-specific reference signals associated with EPDCCH.

The CSI-RS is provided for a user equipment to predict the channel state. A CSI-RS transmitted with nonzero power is referred to as a nonzero power CSI-RS (NZP CSI-RS). In some cases, in order to avoid interference, it needs to transmit the CSI-RS with zero power to avoid the data transmission on some RE on the PDSCH, and this is referred to as zero power CSI-RS (ZP CSI-RS), the corresponding resource element set is Zero Power CSI-RS Resource. In some cases, in order to measure the interference, the CSI-RS is transmitted with zero power, and at this point, the corresponding resource element set is referred to as Channel-State Information-Interference Measurement Resource (CSI-IM Resource).

CSI reference signal (CSI-RS) configuration is provided for indicating an RE mapped by the CSI-RS, i.e., an RE used for transmitting the CSI-RS, and the CSI-RS configuration sequence number is provided for distinguishing between different CSI-RS configurations. The transmitting or mapping of an RE set of a CSI-RS under a CSI-RS configuration is referred to as a CSI-RS resource pattern. CSI-RS subframe configuration is provided for indicating the subframe on which CSI-RS transmission occurs.

A CSI-RS configuration is a CSI-RS configuration under a certain number of antenna ports, for example, a CSI-RS configuration with an antenna port number of 8 and a configuration sequence number of 0. A CSI-RS resource pattern is a CSI-RS resource pattern under a certain number of antenna ports. For example, a CSI-RS resource pattern with an antenna port number of 8 and an index of 0. Generally, the configuration sequence number is the index.

An RE set of a CSI-RS transmitting or mapping a part of the ports under the CSI-RS configuration is referred to as a partial port RS resource pattern. For example, a port RS resource pattern with a port sequence number of {15,16,17,18}.

CSI-RS with a port number of 1, 2, 4 and 8 is supported in the prior art, and CSI-RS resource patterns of these port numbers are repeated on each PRB pair in the range of the bandwidth on the transmission subframe.

The RE sets of the CSI-RS resource patterns of all the configurations with different port numbers are the same, i.e., the RE set of the CSI-RS resource pattern of all the configurations with a port number of 2 equals to the RE set of the CSI-RS resource pattern of all the configurations with a port number of 4 and equals to the RE set of the CSI-RS resource pattern of all the configurations with a port number of 8. For example, for the common CSI-RS configuration of Frame structure type 1 and Frame structure type 2, the RE sets of the CSI-RS resource pattern of all the configurations with different port numbers are the same, and the RE number on one PRB pair is 40.

FIG. 4 is a schematic diagram showing a resource pattern of a CSI-RS with a port number of 4 on an RB pair in the prior art, and FIG. 5 is a schematic diagram showing a resource pattern of a CSI-RS with a port number of 8 on an RB pair in the prior art, as shown in FIG. 4 and FIG. 5.

In order to make full use of the power and improve the precision of channel measurement, the CSI-RS of each port is further divided into groups, i.e., one of the groups includes the CSI-RS of a plurality of ports, and there are groups of different numbers from one to many. The CSI-RS of each port in a group may be mapped to a group of common REs in a code division multiplexing mode. For example, the port number in the group is N, and the CSI-RS sequence is $\{r_0, r_1, L, r_{N-1}\}$; there further exist a sequence group $\{w_0^p, w_1^p, L, w_{N-1}^p\}$ with a length of N, with p=K+0, K+1, . . . , K+N−1, and there are N sequences in the group, which are orthogonal to each other, i.e., $\Sigma_{m=0}^{N-1} w_m^i w_m^j = 0$, with i, j=K+0, K+1, K+N−1 and i≠j; sequence $\{w_0^p, w_1^p, L, w_{N-1}^p\}$ is modulated by CSI-RS sequence $\{r_0, r_1, L, r_{N-1}\}$ to obtain a CSI-RS sequence $\{r_0 w_0^p, r_1 w_1^p, L, r_{N-1} w_{N-1}^p\}$ with a port of p. Corresponding to a group of common REs, the elements in the CSI-RS sequence with the port of p are mapped to REs in a one-to-one correspondence. N is the length of multiplex.

In the prior art, the CSI-RS between the ports is multiplexed and mapped to the RE in the following mode: the ports are divided into groups, such as totally four groups of {15,16}, {17,18}, {19,20} and {21,22}. The four groups are multiplexed to the RE in a Frequency Division mode; but the CSI-RSs on the ports in the group are multiplexed to the RE in a Code Division mode. For example, the CSI-RS of port 15 and the CSI-RS of port 16 are multiplexed in Code Division mode on the time domain.

The base station notifies information on the user equipment of the CSI-RS information via an upper-level signaling. The information includes: a CSI-RS resource configuration identity, a CSI-RS port number, a CSI-RS configuration and a CSI-RS subframe configuration.

There are four types of scenarios for CSI-RS transmission. The first type is used in the case of NCP, and it may be not only provided for transmitting a CSI-RS on Frame structure type 1, but also provided for transmitting a CSI-RS on Frame structure type 2, where CSI-RSs of 4 ports, i.e., with port numbers of 0, 1, 2, 3, may be transmitted on the transmission subframe.

The second type is used in the case of NCP, and it may be only provided for transmitting a CSI-RS on Frame structure type 2, where CSI-RSs of 2 ports, i.e., with port numbers of 0, 1, may be transmitted on the transmission subframe, while CRSs of port numbers 2, 3 cannot be transmitted.

The third case is used in the case of ECP, and it may be not only provided for transmitting a CSI-RS on Frame structure type 1, but also provided for transmitting a CSI-RS on Frame structure type 2, where CSI-RSs of 4 ports, i.e., with port numbers of 0,1,2,3, may be transmitted on the transmission subframe.

The fourth case is used in the case of ECP, it may be only provided for transmitting a CSI-RS on Frame structure type 2, where CSI-RSs of 2 ports, i.e., with port numbers of 0, 1, may be transmitted on the transmission subframe, while CRSs of port numbers of 2, 3 cannot be transmitted.

As the number of antennas increases, a larger gain may be brought to a radio system. However, RE overhead would be added when reference signals of a larger number of antennas are transmitted. In the case that the RE number provided by each RB for CSI-RS overhead on the downlink normal subframe is determined, the multiplexed number of the CSI-RS decreases, which would affect the coordination of CSI-RS transmission between cells, thus increasing the complexity of coordination, and introducing a larger interference to channel measurement.

When a CSI-RS is transmitted on DwPTS, resources for transmitting the CSI-RS may be added, so that the multiplexed number of the CSI-RSs may be increased. At present, there is still a problem on how to support the transmission of a CSI-RS in DwPTS in the above four types of scenarios for CSI-RS transmission. Moreover, there are also two problems on transmitting CSI-RS in DwPTS: One is that the CSI-RS is only transmitted on DwPTS under one CSI-RS resource configuration; and the other is that the CSI-RS is transmitted not only in the DwPTS but also on a downlink normal subframe under one CSI-RS resource configuration. For example, the period of the DwPTS is 10 ms, and if the CSI-RS needs to be transmitted on DwPTS and the transmission period of the CSI-RS is 5 ms, the CSI-RS is not only transmitted on DwPTS, but also transmitted on the downlink normal subframe. This will complicate the transmission of CSI-RS in DwPTS.

For the problem of transmitting CSI-RS in DwPTS in a CSI-RS transmission scenario of the prior art, there is no effective solutions at present.

SUMMARY

Embodiments of the disclosure provide a method and a device of configuring a channel state information-reference signal (CSI-RS) to solve at least the problem in the prior art that transmitting CSI-RS in DwPTS in a CSI-RS transmission scenario is complex.

According to one aspect of the embodiments of the disclosure, there provides a method of configuring a channel state information-reference signal (CSI-RS), including: generating, by a base station, a signaling including configuration information of a CSI-RS; and transmitting, by the base station, the signaling including the configuration information of the CSI-RS, and the configuration information includes a CSI-RS port number, CSI-RS resource patterns and a CSI-RS subframe configuration.

The CSI-RS resource pattern includes at least one of: a CSI-RS resource pattern transmitted on a downlink normal subframe, or a CSI-RS resource pattern transmitted on a downlink pilot time slot (DwPTS).

The CSI-RS subframe configuration includes a CSI-RS subframe configuration transmitted on both the DwPTS and the downlink normal subframe.

Alternatively, the CSI-RS resource pattern transmitted on the DwPTS includes at least one of: a resource pattern for a first-type CSI-RS transmission scenario; a resource pattern for a second-type CSI-RS transmission scenario; a resource pattern for a third-type CSI-RS transmission scenario; and a resource pattern for a fourth-type CSI-RS transmission scenario.

Alternatively, the method further includes: when the CSI-RS subframe configuration is a CSI-RS subframe configuration in which a CSI-RS is transmitted on both the DwPTS and the downlink normal subframe, information of the CSI-RS resource pattern indicates both the CSI-RS resource pattern transmitted on the DwPTS and the CSI-RS resource pattern transmitted on the downlink normal subframe.

Alternatively, the method further includes: each of the CSI-RS resource patterns transmitted on the DwPTS has corresponding one of CSI-RS resource patterns transmitted on the downlink normal subframe; when the CSI-RS subframe configuration is transmitted on both the DwPTS and the downlink normal subframe, information of the CSI-RS resource configuration pattern indicates both the CSI-RS resource patterns transmitted on the DwPTS and the CSI-RS resource patterns transmitted on the downlink normal subframe that correspond to the CSI-RS resource pattern transmitted on the DwPTS.

Alternatively, the information of the CSI-RS resource configuration pattern is an index of the CSI-RS resource pattern transmitted on the downlink normal subframe.

Alternatively, the information of the CSI-RS resource configuration pattern is an index of the CSI-RS resource pattern transmitted on the DwPTS.

Alternatively, each of the CSI-RS resource patterns transmitted on the DwPTS having the corresponding one of the CSI-RS resource patterns transmitted on the downlink normal subframe includes of followings that: in a first-type CSI-RS transmission scenario, the CSI-RS resource patterns of the DwPTS with a special subframe configuration of {3,4,8,9} have a one-to-one correspondence with the CSI-RS resource patterns of the downlink normal subframe; in the first-type CSI-RS transmission scenario, the CSI-RS resource patterns of the DwPTS with a special subframe configuration of {1,2,6,7} have a one-to-one correspondence with a part of the CSI-RS resource patterns of the downlink normal subframe; in a second-type CSI-RS transmission scenario, the CSI-RS resource patterns of the DwPTS with a special subframe configuration of {3,4,8,9} have a one-to-one correspondence with the CSI-RS resource patterns of the downlink normal subframe; in the second-type CSI-RS transmission scenario, the CSI-RS resource patterns of the DwPTS with a special subframe configuration of {1,2,6,7} have a one-to-one correspondence with the CSI-RS resource patterns of the downlink normal subframe; in a third-type CSI-RS transmission scenario, the CSI-RS resource patterns of the DwPTS with a special subframe configuration of {1,2,3,5,6,7} have a one-to-one correspondence with a part of the CSI-RS resource patterns of the downlink normal subframe; in a fourth-type CSI-RS transmission scenario, the CSI-RS resource patterns of the DwPTS with a special subframe configuration of {1,2,3,5,6,7} have a one-to-one correspondence with a part of candidate CSI-RS resource patterns of the downlink normal subframe.

Alternatively, each of the CSI-RS resource patterns transmitted on the DwPTS has the same index as the corresponding one of the CSI-RS resource patterns transmitted on the downlink normal subframe.

Alternatively, the CSI-RS resource pattern transmitted on the DwPTS in a third-type CSI-RS transmission scenario is the same as the CSI-RS resource pattern transmitted on the DwPTS in a fourth-type CSI-RS transmission scenario.

Alternatively, each of the CSI-RS resource patterns transmitted on the DwPTS and the corresponding one of the CSI-RS resource patterns transmitted on the downlink normal subframe have different resource element RE positions, and the different resource element RE positions include different positions of orthogonal frequency division multiplex OFDM symbols at which the RE is located or different positions of subcarriers at which the RE is located.

Alternatively, the same CSI-RS resource patterns transmitted on the DwPTS have different indexes in the following two scenarios: the third-type CSI-RS transmission scenario, and the fourth-type CSI-RS transmission scenario.

According to another aspect of the embodiments of the disclosure, there further provides a device for configuring a channel state information reference signal (CSI-RS), which is located in a base station, and the device includes: a generation module, configured to generate a signaling including configuration information of a CSI-RS; and a transmission module, configured to transmit the signaling including the configuration information of the CSI-RS, and the configuration information includes a CSI-RS port number, a CSI-RS resource pattern and a CSI-RS subframe configuration.

The CSI-RS resource pattern includes at least one of: a CSI-RS resource pattern transmitted on a downlink normal subframe, or a CSI-RS resource pattern transmitted on a downlink pilot time slot (DwPTS).

The CSI-RS subframe configuration includes: a CSI-RS subframe configuration transmitted on both the DwPTS and the downlink normal subframe.

Alternatively, the CSI-RS resource pattern transmitted on the DwPTS includes at least one of: a resource pattern for a first-type CSI-RS transmission scenario; a resource pattern for a second-type CSI-RS transmission scenario; a resource pattern for a third-type CSI-RS transmission scenario; and a resource pattern for a fourth-type CSI-RS transmission scenario.

Alternatively, when the CSI-RS subframe configuration is a CSI-RS subframe configuration in which a CSI-RS is transmitted on both the DwPTS and the downlink normal subframe, information of the CSI-RS resource pattern indicates both the CSI-RS resource pattern transmitted on the DwPTS and the CSI-RS resource pattern transmitted on the downlink normal subframe.

Alternatively, each of the CSI-RS resource patterns transmitted on the DwPTS has corresponding one of CSI-RS resource patterns transmitted on the downlink normal subframe; when the CSI-RS subframe configuration is transmitted on both the DwPTS and the downlink normal subframe, information of the CSI-RS resource configuration pattern indicates both the CSI-RS resource patterns transmitted on the DwPTS and the CSI-RS resource patterns transmitted on the downlink normal subframe that correspond to the CSI-RS resource pattern transmitted on the DwPTS.

Alternatively, the information of the CSI-RS resource configuration pattern is an index of the CSI-RS resource pattern transmitted on the downlink normal subframe.

Alternatively, the information of the CSI-RS resource configuration pattern is an index of the CSI-RS resource pattern transmitted on the DwPTS.

Alternatively, each of the CSI-RS resource patterns transmitted on the DwPTS having the corresponding one of the CSI-RS resource patterns transmitted on the downlink normal subframe includes of followings that: in a first-type CSI-RS transmission scenario, the CSI-RS resource patterns of the DwPTS with a special subframe configuration of {3,4,8,9} have a one-to-one correspondence with the CSI-RS resource patterns of the downlink normal subframe; in the first-type CSI-RS transmission scenario, the CSI-RS resource patterns of the DwPTS with a special subframe configuration of {1,2,6,7} have a one-to-one correspondence with a part of the CSI-RS resource patterns of the downlink normal subframe; in a second-type CSI-RS transmission scenario, the CSI-RS resource patterns of the DwPTS with a special subframe configuration of {3,4,8,9} have a one-to-one correspondence with the CSI-RS resource patterns of the downlink normal subframe; in the second-type CSI-RS transmission scenario, the CSI-RS resource patterns of the DwPTS with a special subframe configuration of {1,2,6,7} have a one-to-one correspondence with the CSI-RS resource patterns of the downlink normal subframe; in a third-type CSI-RS transmission scenario, the CSI-RS resource patterns of the DwPTS with a special subframe configuration of {1,2,3,5,6,7} have a one-to-one correspondence with a part of the CSI-RS resource patterns of the downlink normal subframe; and in a fourth-type CSI-RS transmission scenario, the CSI-RS resource patterns of the DwPTS with a special subframe configuration of {1,2,3,5, 6,7} have a one-to-one correspondence with a part of candidate CSI-RS resource patterns of the downlink normal subframe.

Alternatively, each of the CSI-RS resource patterns transmitted on the DwPTS has the same index as the corresponding one of the CSI-RS resource patterns transmitted on the downlink normal subframe.

Alternatively, the CSI-RS resource pattern transmitted on the DwPTS in a third-type CSI-RS transmission scenario is the same as the CSI-RS resource pattern transmitted on the DwPTS in a fourth-type CSI-RS transmission scenario.

Alternatively, each of the CSI-RS resource patterns transmitted on the DwPTS and the corresponding one of the CSI-RS resource patterns transmitted on the downlink normal subframe have different resource element RE positions, and the different resource element RE positions include different positions of orthogonal frequency division multiplex OFDM symbols at which the RE is located or different positions of subcarriers at which the RE is located.

Alternatively, the same CSI-RS resource patterns transmitted on the DwPTS have different indexes in the following two scenarios: the third-type CSI-RS transmission scenario, and the fourth-type CSI-RS transmission scenario.

In the embodiments of the disclosure, there further provides a computer storage medium on which executive instructions are stored, the executive instructions being configured to perform the method of configuring a CSI-RS according to the above embodiments.

In the embodiments of the disclosure, a base station generates a signaling including configuration information of a CSI-RS, and the base station transmits the signaling including the configuration information of the CSI-RS, and the configuration information includes a CSI-RS port number, a CSI-RS resource pattern and a CSI-RS subframe configuration; the CSI-RS resource pattern includes at least one of: a CSI-RS resource pattern transmitted on a downlink normal subframe, or a CSI-RS resource pattern transmitted on a downlink pilot time slot (DwPTS); the CSI-RS subframe configuration includes: a CSI-RS subframe configuration transmitted on both the DwPTS and the downlink normal subframe. Therefore, the complicated problem of transmitting CSI-RS in DwPTS in a CSI-RS transmission scenario may be solved, and the complexity of transmitting CSI-RS in DwPTS may be reduced.

BRIEF DESCRIPTION OF THE DRAWINGS

The drawings illustrated here are used for providing further understanding of the disclosure and forming a part of the disclosure.

DETAILED DESCRIPTION

The disclosure will be illustrated in detail below in conjunction with the drawings and embodiments. It needs to be noted that, the embodiments of the disclosure and the features in the embodiments may be combined in the case of no conflict.

It should be noted that, terms "first" and "second", etc., in the specification, the claims and the above drawings of the disclosure are provided for distinguishing between similar objects, rather than describing a specific order or sequence.

Figure 1:
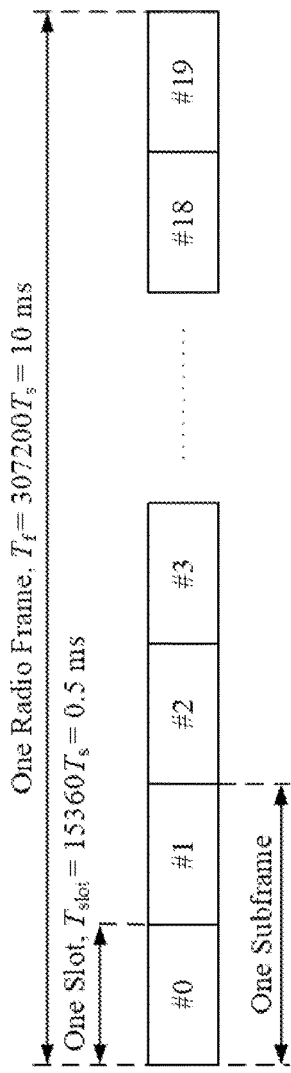
FIG. 1 is a schematic diagram showing Frame structure type 1 in the prior art.
Figure 2:
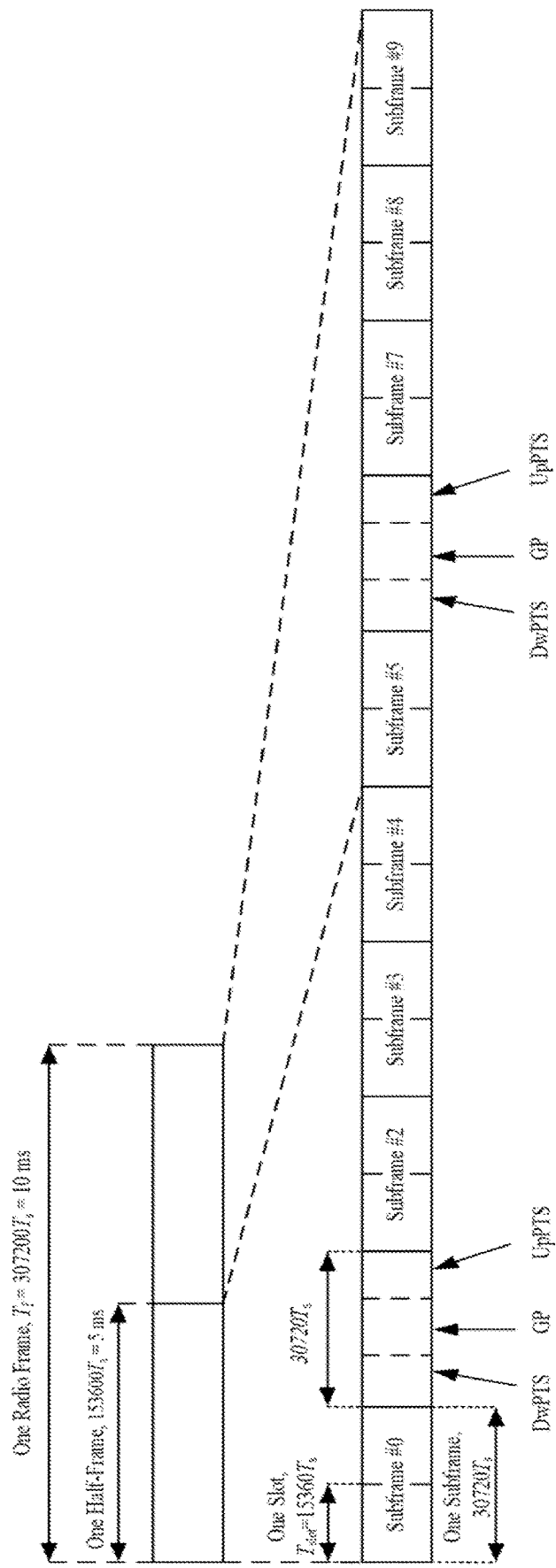
FIG. 2 is a schematic diagram showing Frame structure type 2 in the prior art.
Figure 3:
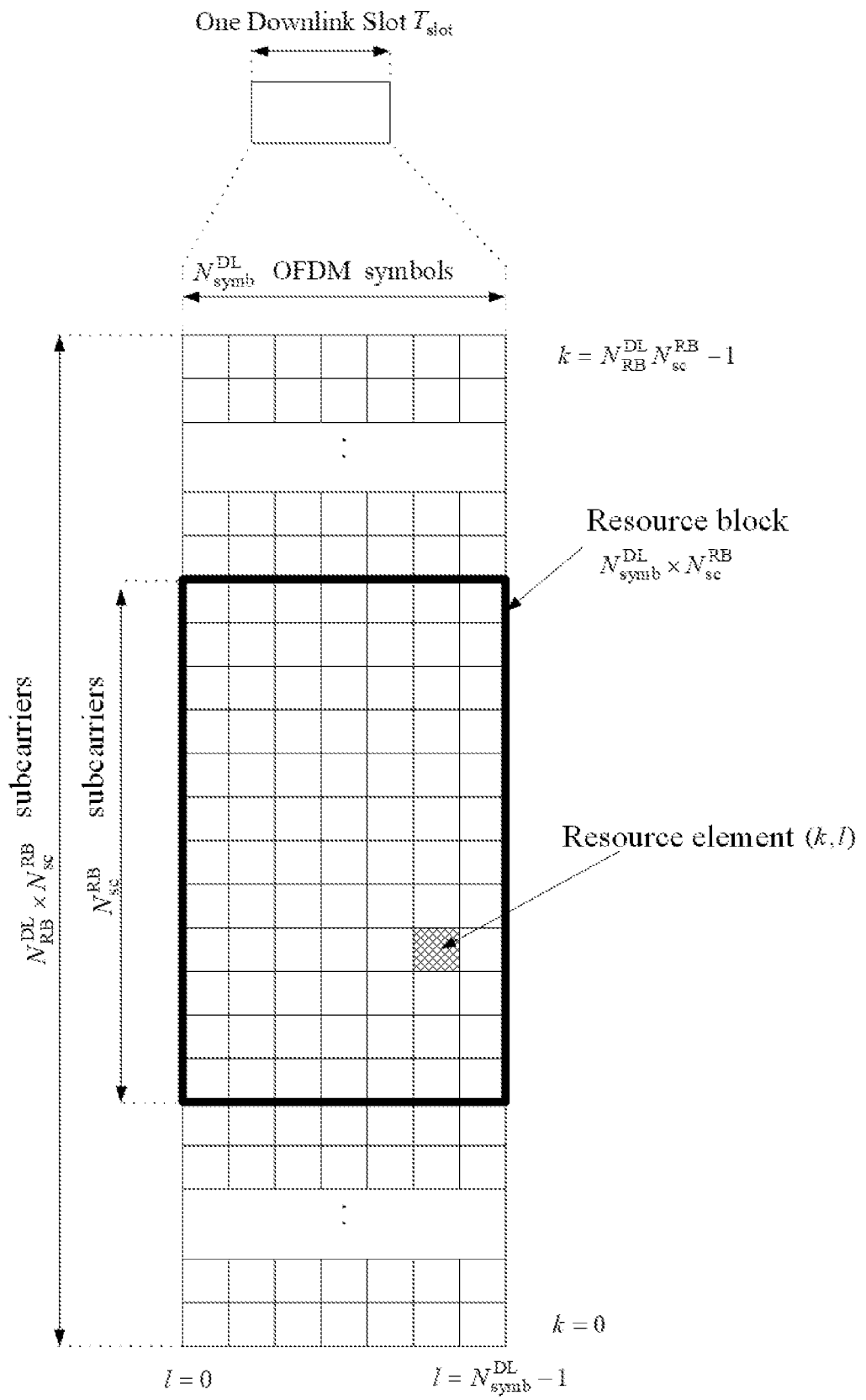
FIG. 3 is a schematic diagram showing a downlink resource network in the prior art.
Figure 4:
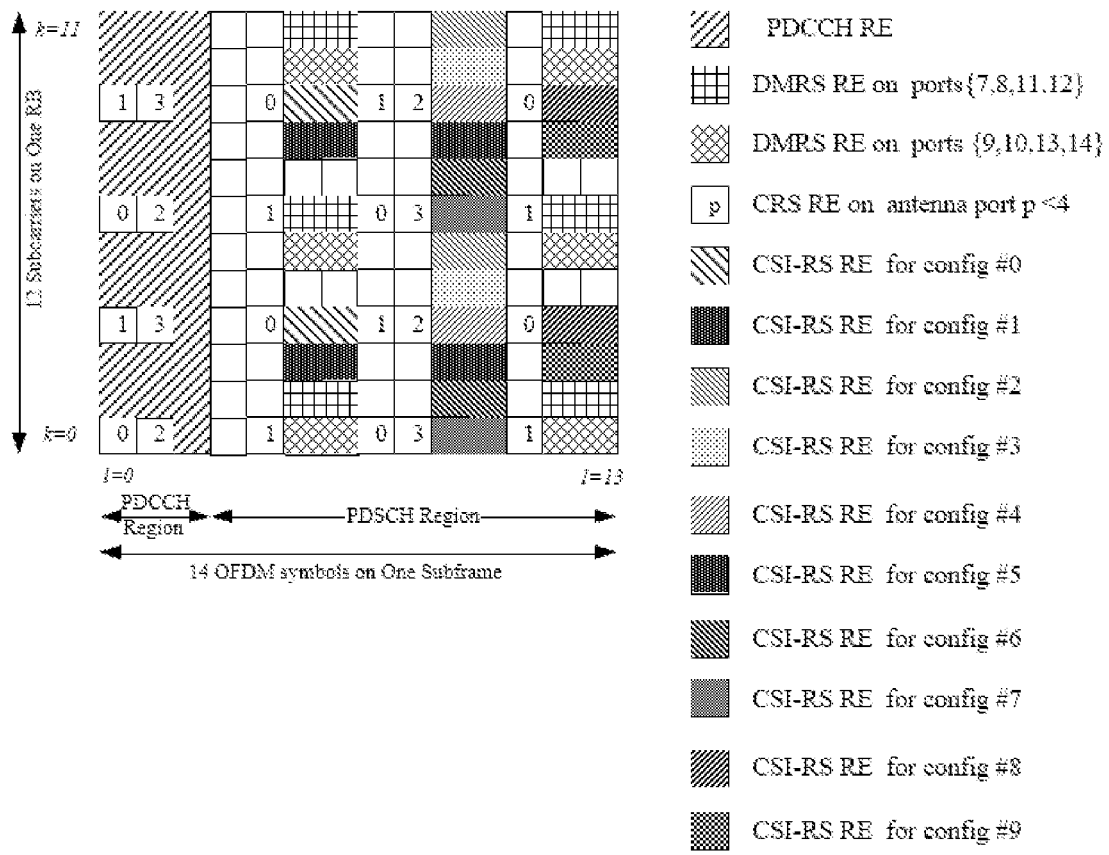
FIG. 4 is a schematic diagram showing a resource pattern of a CSI-RS with a port number of 4 on an RB pair in the prior art.
Figure 5:
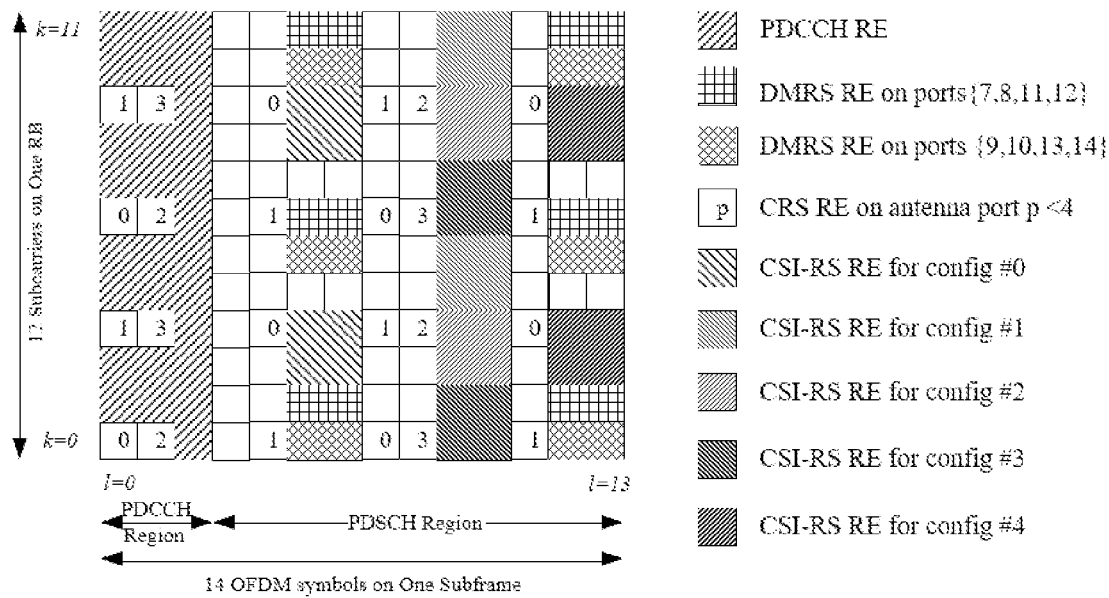
FIG. 5 is a schematic diagram showing a resource pattern of a CSI-RS with a port number of 8 on an RB pair in the prior art.
Figure 6:
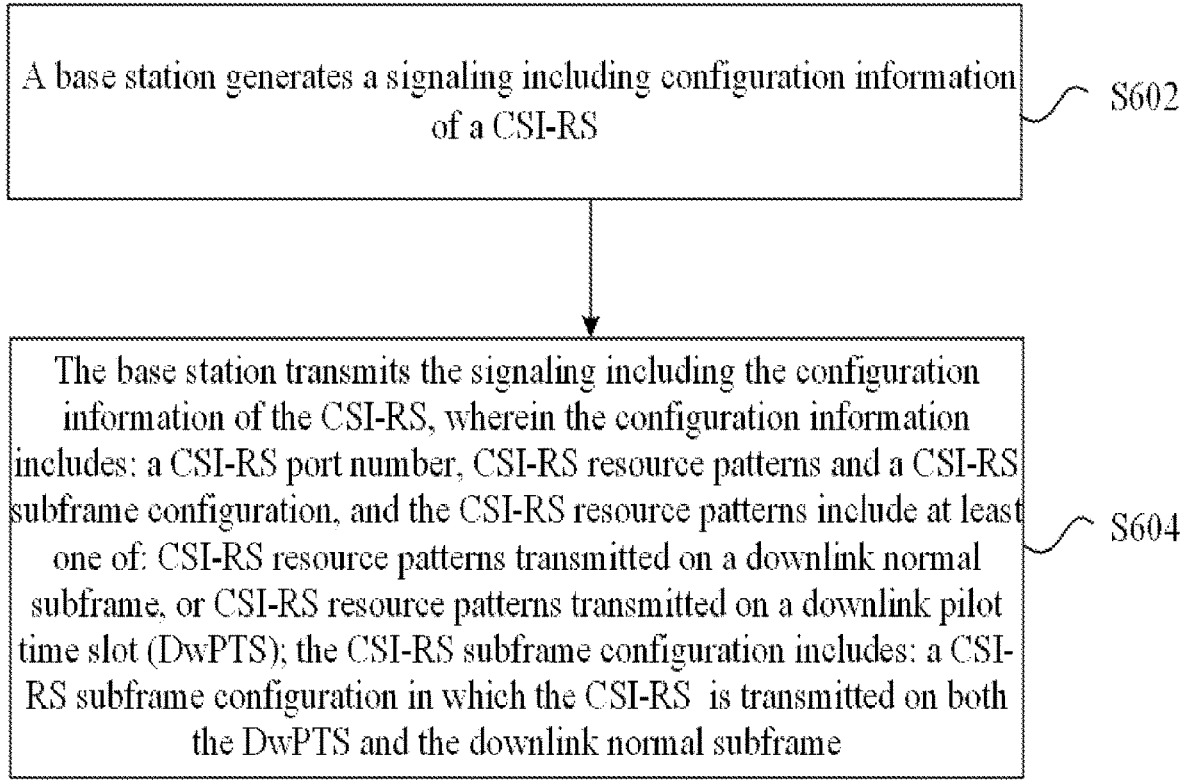
FIG. 6 is a flow chart of a method of configuring a CSI-RS according to one embodiment of the disclosure.

One embodiment of the disclosure provides a method of configuring a channel state information-reference signal (CSI-RS). FIG. 6 is a flow chart of a method of configuring a CSI-RS according to one embodiment of the disclosure. As shown in FIG. 6, the method includes the steps below.

Step S602: A base station generates a signaling including configuration information of a CSI-RS.

Step S604: The base station transmits the signaling including the configuration information of the CSI-RS, and the configuration information includes: a CSI-RS port number, a CSI-RS resource pattern and a CSI-RS subframe configuration, and the CSI-RS resource pattern includes at least one of: a CSI-RS resource pattern transmitted on a normal downlink normal subframe, and a CSI-RS resource pattern transmitted on a DwPTS; the CSI-RS subframe configuration includes: a CSI-RS subframe configuration transmitted on both the DwPTS and the downlink normal subframe.

By the above steps, the base station transmits the signaling including the configuration information of the CSI-RS, and the configuration information includes: a CSI-RS resource pattern transmitted on a downlink normal subframe, or a CSI-RS resource pattern transmitted on a DwPTS. The CSI-RS subframe configuration includes: a CSI-RS subframe configuration transmitted on both the DwPTS and the downlink normal subframe. Therefore, the problem of transmitting CSI-RS in DwPTS in a CSI-RS transmission scenario may be solved, and the complexity of transmitting CSI-RS in DwPTS may be reduced.

In this embodiment, the CSI-RS resource pattern transmitted on a DwPTS includes at least one of: a resource pattern for a first-type CSI-RS transmission scenario; a resource pattern for a second-type CSI-RS transmission scenario; a resource pattern for a third-type CSI-RS transmission scenario; and a resource pattern for a fourth-type CSI-RS transmission scenario.

In this embodiment, when the CSI-RS subframe configuration is a CSI-RS subframe configuration in which a CSI-RS is transmitted on both the DwPTS and the downlink normal subframe, the information of the CSI-RS resource pattern both indicates the CSI-RS resource pattern transmitted on the DwPTS, and indicates the CSI-RS resource pattern transmitted on a downlink normal subframe.

In this embodiment, each of the CSI-RS resource patterns transmitted on the DwPTS has a corresponding CSI-RS resource pattern transmitted on a downlink normal subframe.

When the CSI-RS subframe configuration is transmitted on both the DwPTS and the downlink normal subframe, information of the CSI-RS resource configuration pattern not only indicates the CSI-RS resource pattern transmitted on the DwPTS, but also indicates the CSI-RS resource pattern transmitted on the downlink normal subframe that corresponds to the CSI-RS resource pattern transmitted on the DwPTS.

In this embodiment, the information of the CSI-RS resource configuration patterns is the indexes of the CSI-RS resource patterns transmitted on the downlink normal subframe.

In this embodiment, the information of the CSI-RS resource configuration patterns is the indexes of the CSI-RS resource patterns transmitted on the DwPTS.

In this embodiment, each of the CSI-RS resource patterns transmitted on the DwPTS has a corresponding CSI-RS resource pattern transmitted on a downlink normal subframe, including one of the following:

In the first-type CSI-RS transmission scenario, the CSI-RS resource patterns on the DwPTS with a special subframe configuration of {3,4,8,9} have a one-to-one correspondence with the CSI-RS resource patterns of the downlink normal subframe.

In the first-type CSI-RS transmission scenario, the CSI-RS resource patterns on the DwPTS with a special subframe configuration of {1,2,6,7} have a one-to-one correspondence with a part of the CSI-RS resource patterns of the downlink normal subframe.

In the second-type CSI-RS transmission scenario, the CSI-RS resource patterns on the DwPTS with a special subframe configuration of {3,4,8,9} have a one-to-one correspondence with the CSI-RS resource patterns of the downlink normal subframe.

In the second-type CSI-RS transmission scenario, the CSI-RS resource patterns on the DwPTS with a special subframe configuration of {1,2,6,7} have a one-to-one correspondence with the CSI-RS resource patterns of the downlink normal subframe.

In the third-type CSI-RS transmission scenario, the CSI-RS resource patterns on the DwPTS with a special subframe configuration of {1,2,3,5,6,7} have a one-to-one correspondence with a part of the CSI-RS resource patterns of the downlink normal subframe.

In the fourth-type CSI-RS transmission scenario, the CSI-RS resource patterns on the DwPTS with a special subframe configuration of {1,2,3,5,6,7} have a one-to-one correspondence with a part of candidate CSI-RS resource patterns of the downlink normal subframe.

In this embodiment, each of the CSI-RS resource patterns transmitted on the DwPTS has the same index as the corresponding one of the CSI-RS resource patterns transmitted on the downlink normal subframe.

In this embodiment, the CSI-RS resource pattern transmitted on the DwPTS is the same in the following two scenarios: the third-type CSI-RS transmission scenario, and the fourth-type CSI-RS transmission scenario.

In this embodiment, each of the CSI-RS resource patterns transmitted on the DwPTS and the corresponding one of the CSI-RS resource patterns transmitted on the downlink normal subframe have different resource element RE positions, and the different resource element RE positions include different positions of orthogonal frequency division multiplex OFDM symbols at which the RE is located or different positions of subcarriers at which the RE is located.

In this embodiment, the same CSI-RS resource patterns transmitted on the DwPTS have different indexes in the following two scenarios: the third-type CSI-RS transmission scenario, and the fourth-type CSI-RS transmission scenario.

In one embodiment of the disclosure, there further provides a device for configuring a channel state information reference signal (CSI-RS), which is configured for implementing the above embodiments and preferred embodiments. The embodiments illustrated will not be described again here. As used below, the term "module" may be a combination of software and/or hardware for implementing a preset function. Although the device described in the embodiments below is preferably implemented as software, an implementation of hardware or a combination of software and hardware may also be conceived.

Figure 7:
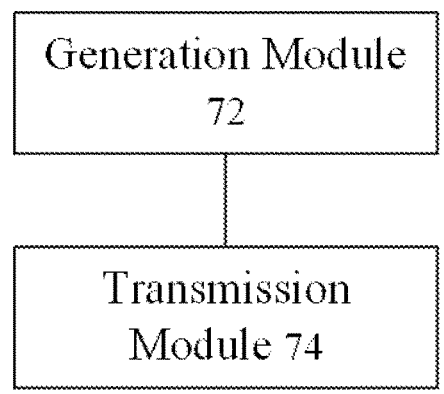
FIG. 7 is a block diagram of a device for configuring a CSI-RS according to one embodiment of the disclosure.

FIG. 7 is a block diagram of a device for configuring a CSI-RS according to one embodiment of the disclosure. As shown in FIG. 7, the device is located in a base station, and the device includes: a generation module 72, configured to generate a signaling including configuration information of a CSI-RS; a transmission module 74, configured to transmit the signaling including the configuration information of the CSI-RS, and the configuration information includes: a CSI- RS port number, a CSI-RS resource pattern and a CSI-RS subframe configuration; the CSI-RS resource pattern includes at least one of: a CSI-RS resource pattern transmitted on a downlink normal subframe, or a CSI-RS resource pattern transmitted on a DwPTS; and the CSI-RS subframe configuration includes: a CSI-RS subframe configuration transmitted on both the DwPTS and the downlink normal subframe.

By the above device, the transmission module 74 transmits a signaling including configuration information of a CSI-RS, and the configuration information includes: an antenna port number, a CSI-RS resource pattern and a CSI-RS subframe configuration; the CSI-RS resource pattern includes at least one of: a CSI-RS resource pattern transmitted on a downlink normal subframe, or a CSI-RS resource pattern transmitted on a DwPTS; and the CSI-RS subframe configuration includes: a CSI-RS subframe configuration transmitted on both the DwPTS and the downlink normal subframe. Therefore, the complicated problem of transmitting CSI-RS in DwPTS in a CSI-RS transmission scenario may be solved, and the complexity of transmitting CSI-RS in DwPTS may be reduced.

In this embodiment, the CSI-RS resource pattern transmitted on a DwPTS includes at least one of: a resource pattern for a first-type CSI-RS transmission scenario; a resource pattern for a second-type CSI-RS transmission scenario; a resource pattern for a third-type CSI-RS transmission scenario; and a resource pattern for a fourth-type CSI-RS transmission scenario.

In this embodiment, when the CSI-RS subframe configuration is a CSI-RS subframe configuration in which a CSI-RS is transmitted on both the DwPTS and the downlink normal subframe, and the information of the CSI-RS resource pattern not only indicates the CSI-RS resource pattern transmitted on the DwPTS, but also indicates the CSI-RS resource pattern transmitted on a downlink normal subframe.

In this embodiment, each of the CSI-RS resource patterns transmitted on the DwPTS has a corresponding CSI-RS resource pattern transmitted on a downlink normal subframe.

When the CSI-RS subframe configuration is transmitted on both the DwPTS and the downlink normal subframe, information of the CSI-RS resource configuration pattern not only indicates the CSI-RS resource pattern transmitted on the DwPTS, but also indicates the CSI-RS resource pattern transmitted on the downlink normal subframe that corresponds to the CSI-RS resource pattern transmitted on the DwPTS.

In this embodiment, the information of the CSI-RS resource configuration pattern is the index of the CSI-RS resource pattern transmitted on the downlink normal subframe.

In this embodiment, the information of the CSI-RS resource configuration pattern is the index of the CSI-RS resource pattern transmitted on the DwPTS.

In this embodiment, each of the CSI-RS resource patterns transmitted on the DwPTS has a corresponding CSI-RS resource pattern transmitted on a downlink normal subframe, including one of the following:

In the first-type CSI-RS transmission scenario, the CSI-RS resource patterns on the DwPTS with a special subframe configuration of {3,4,8,9} have a one-to-one correspondence with the CSI-RS resource patterns of the downlink normal subframe.

In the first-type CSI-RS transmission scenario, the CSI-RS resource patterns on the DwPTS with a special subframe configuration of {1,2,6,7} have a one-to-one correspondence with a part of the CSI-RS resource patterns of the downlink normal subframe.

In the second-type CSI-RS transmission scenario, the CSI-RS resource patterns on the DwPTS with a special subframe configuration of {3,4,8,9} have a one-to-one correspondence with the CSI-RS resource patterns of the downlink normal subframe.

In the second-type CSI-RS transmission scenario, the CSI-RS resource patterns on the DwPTS with a special subframe configuration of {1,2,6,7} have a one-to-one correspondence with the CSI-RS resource patterns of the downlink normal subframe.

In the third-type CSI-RS transmission scenario, the CSI-RS resource patterns on the DwPTS with a special subframe configuration of {1,2,3,5,6,7} have a one-to-one correspondence with a part of the CSI-RS resource patterns on the downlink normal subframe.

In the fourth-type CSI-RS transmission scenario, the CSI-RS resource patterns of the DwPTS with a special subframe configuration of {1,2,3,5,6,7} have a one-to-one correspondence with a part of candidate CSI-RS resource patterns on the downlink normal subframe.

In this embodiment, each of the CSI-RS resource patterns transmitted on the DwPTS has the same index as the corresponding one of the CSI-RS resource patterns transmitted on the downlink normal subframe.

In this embodiment, the CSI-RS resource pattern transmitted on a DwPTS is the same in the following two scenarios: the third-type CSI-RS transmission scenario, and the fourth-type CSI-RS transmission scenario.

In this embodiment, each of the CSI-RS resource patterns transmitted on the DwPTS and the corresponding one of the CSI-RS resource patterns transmitted on the downlink normal subframe have different resource element RE positions, and the different resource element RE positions include different positions of orthogonal frequency division multiplex OFDM symbols at which the RE is located or different positions of subcarriers at which the RE is located.

In this embodiment, the same CSI-RS resource patterns transmitted on the DwPTS have different indexes in the following two scenarios: the third-type CSI-RS transmission scenario, and the fourth-type CSI-RS transmission scenario.

The disclosure will be illustrated in detail below in conjunction with preferred embodiments.

Embodiments of the disclosure provide a method and a device for configuring a CSI-RS in a TDD radio communication system, which are provided for supporting the transmission of CSI-RS in DwPTS, solving the problem of transmitting a CSI-RS in 4 transmission scenarios, and solving the problem of transmitting a CSI-RS in DwPTS in two situations.

Figure 8:
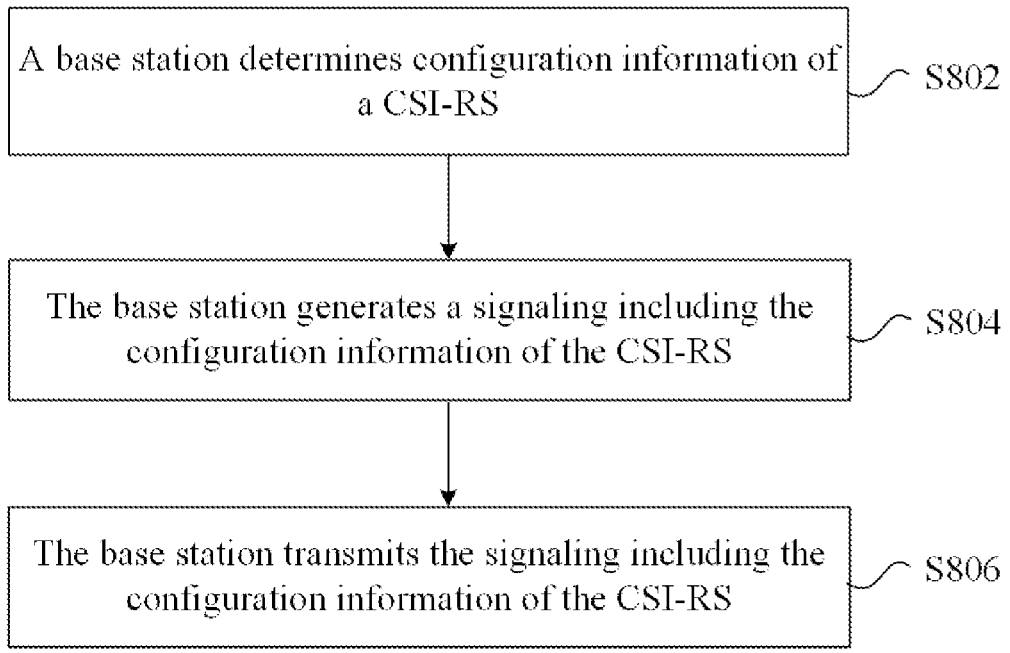
FIG. 8 is a flow chart of a method of configuring a CSI-RS according to one preferred embodiment of the disclosure.

FIG. 8 is a flow chart of a method of configuring a CSI-RS according to one preferred embodiment of the disclosure. As shown in FIG. 8, the method of configuring a CSI-RS according to this embodiment includes the following steps:

Step S802: A base station determines configuration information of a CSI-RS.

Step S804: The base station generates a signaling including the configuration information of the CSI-RS.

Step S806: The base station transmits the signaling including the configuration information of the CSI-RS.

The configuration information includes: an antenna port number, CSI-RS resource patterns and a CSI-RS subframe configuration.

A candidate CSI-RS resource pattern includes: CSI-RS resource patterns transmitted on a downlink normal subframe, or CSI-RS resource patterns transmitted on a DwPTS.

A candidate CSI-RS subframe configuration includes: CSI-RS subframe configuration in which a CSI-RS is transmitted on both the DwPTS and the downlink normal subframe.

Alternatively, the candidate CSI-RS resource patterns transmitted on the DwPTS at least includes resource patterns for a first-type CSI-RS transmission scenario.

Specifically, the four CSI-RS transmission scenarios are different, the signals transmitted thereon are different, and the RE positions for transmitting the CSI-RS are different. Therefore, in order to solve the problem of transmitting a CS-RS on a DwPTS under the first-type CSI-RS transmission scenario, resource patterns for the first-type CSI-RS transmission scenario needs to be included.

Alternatively, the candidate CSI-RS resource pattern transmitted on the DwPTS at least includes resource patterns for a second-type CSI-RS transmission scenario.

Specifically, the four CSI-RS transmission scenarios are different, the signals transmitted thereon are different, and the RE positions for transmitting the CSI-RS are different. Therefore, in order to solve the problem of transmitting a CS-RS on a DwPTS under the second-type CSI-RS transmission scenario, resource patterns for the second-type CSI-RS transmission scenario needs to be included.

Alternatively, the candidate CSI-RS resource pattern transmitted on the DwPTS at least includes resource patterns for a third-type CSI-RS transmission scenario.

Specifically, the four CSI-RS transmission scenarios are different, the signals transmitted thereon are different, and the RE positions for transmitting the CSI-RS are different. Therefore, in order to solve the problem of transmitting a CS-RS on a DwPTS under the third-type CSI-RS transmission scenario, resource patterns for the third-type CSI-RS transmission scenario needs to be included.

Alternatively, the candidate CSI-RS resource pattern transmitted on the DwPTS at least includes resource patterns for a fourth-type CSI-RS transmission scenario.

Specifically, the four CSI-RS transmission scenarios are different, the signals transmitted thereon are different, and the RE positions for transmitting the CSI-RS are different. Therefore, in order to solve the problem of transmitting a CS-RS on a DwPTS under the fourth-type CSI-RS transmission scenario, resource patterns for the fourth-type CSI-RS transmission scenario needs to be included.

Alternatively, when the CSI-RS subframe configuration is a CSI-RS subframe configuration in which a CSI-RS is transmitted on both the DwPTS and the downlink normal subframe, the CSI-RS resource pattern information indicates both CSI-RS resource patterns transmitted on a DwPTS and CSI-RS resource patterns transmitted on a downlink normal subframe.

Specifically, the CSI-RS subframe configuration is a CSI-RS subframe configuration in which a CSI-RS is transmitted on both the DwPTS and the downlink normal subframe, then it requires a CSI-RS resource pattern for transmitting on the DwPTS and a CSI-RS resource patterns for transmitting on the downlink normal subframe, and these two CSI-RS resource patterns correspond to the same CSI-RS resource pattern information.

Alternatively, each candidate CSI-RS resource pattern transmitted on the DwPTS has a corresponding candidate CSI-RS resource pattern transmitted on the downlink normal subframe, and when the CSI-RS subframe configuration is transmitted on both DwPTS and downlink normal subframe, information of the CSI-RS resource configuration patterns will indicate both CSI-RS resource patterns transmitted on a DwPTS and CSI-RS resource patterns transmitted on a normal downlink subframe.

Alternatively, a candidate CSI-RS resource pattern transmitted on the DwPTS corresponds to a candidate CSI-RS resource pattern transmitted on the downlink normal subframe, that is, when the CSI-RS subframe configuration is transmitted on both DwPTS and downlink normal subframe, information of the CSI-RS resource configuration patterns will indicate both CSI-RS resource patterns transmitted on a DwPTS and CSI-RS resource patterns transmitted on a normal downlink subframe.

Alternatively, for the first-type CSI-RS transmission scenario, the candidate CSI-RS resource patterns of the DwPTS with a special subframe configuration of $\{3,4,8,9\}$ have a one-to-one correspondence with the candidate CSI-RS resource patterns of the downlink normal subframe.

Specifically, in the case of NCP, the number of OFDM symbols of the DwPTS with a special subframe configuration of $\{3,4,8,9\}$ is large and close to that of the downlink normal subframes, so that it can be fully used, and thus the candidate CSI-RS resource patterns of the DwPTS have a one-to-one correspondence with the candidate CSI-RS resource patterns of the downlink normal subframe.

Alternatively, for the first-type CSI-RS transmission scenario, the candidate CSI-RS resource patterns of the DwPTS with a special subframe configuration of $\{1,2,6,7\}$ have a one-to-one correspondence with a part of the candidate CSI-RS resource patterns of the downlink normal subframe.

Specifically, the number of OFDM symbols of the DwPTS with a special subframe configuration of $\{1,2,6,7\}$ is small, but it can be used as much as possible, and thus the candidate CSI-RS resource patterns of the DwPTS with a special subframe configuration of $\{1,2,6,7\}$ have a one-to-one correspondence with a part of the candidate CSI-RS resource patterns of the downlink normal subframe.

Alternatively, for the second-type CSI-RS transmission scenario, the candidate CSI-RS resource patterns of the DwPTS with a special subframe configuration of $\{3,4,8,9\}$ have a one-to-one correspondence with the candidate CSI-RS resource patterns of the downlink normal subframe.

Specifically, for the second-type CSI-RS transmission scenario, the CSI-RS on the downlink normal subframe requires a small number of OFDM symbols, and the DwPTS with a special subframe configuration of $\{3,4,8,9\}$ may be sufficient for providing OFDM symbols, so that the candidate CSI-RS resource patterns of the DwPTS with a special subframe configuration of $\{3,4,8,9\}$ have a one-to-one correspondence with the candidate CSI-RS resource patterns of the downlink normal subframe.

Alternatively, for the second-type CSI-RS transmission scenario, the candidate CSI-RS resource patterns of the DwPTS with a special subframe configuration of $\{1,2,6,7\}$ have a one-to-one correspondence with the candidate CSI-RS resource patterns of the downlink normal subframe.

Specifically, for the second-type CSI-RS transmission scenario, the CSI-RS on the downlink normal subframe requires a small number of OFDM symbols, and the DwPTS with a special subframe configuration of $\{1,2,6,7\}$ may be sufficient for providing OFDM symbols, thus the candidate CSI-RS resource patterns of the DwPTS with a special subframe configuration of $\{1,2,6,7\}$ have a one-to-one correspondence with the candidate CSI-RS resource patterns of the downlink normal subframe.

Alternatively, for the third-type CSI-RS transmission scenario, the candidate CSI-RS resource patterns of the DwPTS with a special subframe configuration of {1,2,3,5,6,7} have a one-to-one correspondence with a part of the candidate CSI-RS resource patterns of the downlink normal subframe.

Specifically, the number of OFDM symbols of the DwPTS with a special subframe configuration of {1,2,3,5,6,7} has is small, but it can be used as much as possible, and thus the candidate CSI-RS resource patterns of the DwPTS with a special subframe configuration of {1,2,3,5,6,7} have a one-to-one correspondence with a part of the candidate CSI-RS resource patterns of the downlink normal subframe.

Alternatively, for the fourth-type CSI-RS transmission scenario, the candidate CSI-RS resource patterns of the DwPTS with a special subframe configuration of {1,2,3,5, 6,7} have a one-to-one correspondence with a part of the candidate CSI-RS resource patterns of the downlink normal subframe.

Specifically, the number of OFDM symbols of the DwPTS with a special subframe configuration of {1,2,3,5, 6,7} is small, but it can be used as much as possible, and thus the candidate CSI-RS resource patterns of the DwPTS with a special subframe configuration of {1,2,3,5,6,7} have a one-to-one correspondence with a part of the candidate CSI-RS resource patterns of the downlink normal subframe.

Alternatively, the candidate CSI-RS resource patterns transmitted on the DwPTS with a special subframe configuration of {1,2,3,5,6,7} are the same in the following two scenarios: the third-type CSI-RS transmission scenario, and the fourth-type CSI-RS transmission scenario.

Specifically, by employing the same candidate CSI-RS resource patterns under the two CSI-RS transmission scenarios, not only the two scenarios can be met, but also the complexity of the transmitting device and the receiving device can be decreased.

Figure 9:
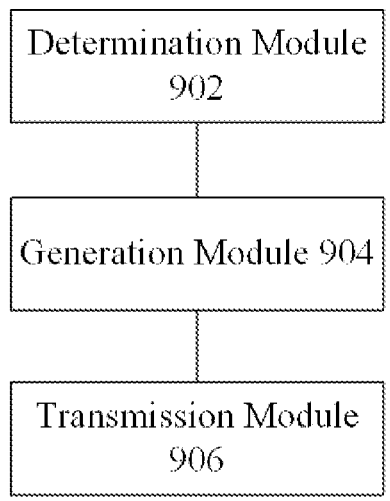
FIG. 9 is a schematic diagram showing a device for configuring a CSI-RS according to one embodiment of the disclosure.

FIG. 9 is a schematic diagram showing a device for configuring a CSI-RS according to one preferred embodiment of the disclosure. As shown in FIG. 9, the device for configuring a CSI-RS according to this embodiment is provided in a base station and includes: a determination module 902, a generation module 904 and a transmission module 906. The determination module 902 is configured to determine the configuration information of a CSI-RS, the generation module 904 is configured to generate a signaling including the configuration information of the CSI-RS, and the transmission module 906 is configured to transmit the signaling including the configuration information of the CSI-RS. The configuration information includes: a CSI-RS port number, a CSI-RS resource pattern and a CSI-RS subframe configuration.

candidate CSI-RS resource patterns include: CSI-RS resource patterns transmitted on a normal downlink subframe, and CSI-RS resource patterns transmitted on a DwPTS.

A candidate CSI-RS subframe configuration includes: a CSI-RS subframe configuration in which a CSI-RS is transmitted on both the DwPTS and the downlink normal subframe.

For example, the transmission module 906 is a communication element capable of transmitting information, such as a transmitter and the like. For example, the determination module 902 and the generation module 904 is an element capable of processing information, such as a processor and the like. However, it is not limited in the disclosure. The above module may be, for example, a combination of software and/or hardware for implementing a preset function.

The disclosure will be illustrated below by a plurality of specific embodiments.

Embodiment 1

In this embodiment, a base station first determines the configuration information of a CSI-RS, then generates a signaling including the configuration information of the CSI-RS, and then transmits the signaling including the configuration information of the CSI-RS. For example, a bits are used for representing the port number information, b bits are used for representing the reference signal resource pattern information, and c bits are used for representing the CSI-RS subframe configuration information, with a+b+c=X.

Or, a bits may be employ for representing the port number information, b bits may be employ for representing a joint code of the reference signal resource pattern information and the CSI-RS subframe configuration information, with a+b=X.

Or, X bits may be employ for representing the port number information, the reference signal resource pattern information and the CSI-RS subframe configuration information.

Or, a bits may be employ for representing the port number information, b bits may be employ for representing the reference signal resource pattern information, and at the same time, the reference signal resource pattern information hints at the CSI-RS subframe configuration information.

The port number may be a value taken from {1,2,4,8,12, 16}.

Candidate CSI-RS resource patterns include: CSI-RS resource patterns transmitted on a downlink normal subframe, or CSI-RS resource patterns transmitted on a DwPTS.

A candidate CSI-RS subframe configuration includes: a CSI-RS subframe configuration in which a CSI-RS is transmitted on both the DwPTS and the downlink normal subframe.

The candidate CSI-RS resource pattern refers to a CSI-RS resource pattern that may be selected by a signaling or CSI-RS resource pattern that is predefined, and the candidate CSI-RS subframe configuration refers to a CSI-RS subframe configuration that may be configured for a signaling or a CSI-RS subframe configuration that is predefined.

Embodiment 2

In this embodiment, the candidate CSI-RS resource patterns transmitted on the DwPTS at least include resource patterns for a first-type CSI-RS transmission scenario. For example, the candidate CSI-RS resource patterns transmitted on the DwPTS with a configuration of {3,4,8,9} may be located on the OFDM symbol with a sequence number of {2,3,5,6,9,10}, and the candidate CSI-RS resource patterns transmitted on the DwPTS with a configuration of {1,2,6,7} may be located on the OFDM symbol with a sequence number of {2,3,5,6}.

Embodiment 3

In this embodiment, the candidate CSI-RS resource patterns transmitted on the DwPTS at least include resource patterns for a second-type CSI-RS transmission scenario.

For example, the candidate CSI-RS resource patterns transmitted on the DwPTS with a configuration of {3,4,8,9} may be located on the OFDM symbol with a sequence number of {8,10}, and the candidate CSI-RS resource patterns transmitted on the DwPTS with a configuration of {1,2,6,7} may be located on the OFDM symbol with a sequence number of {2,5} or the OFDM symbol with a sequence number of {5,8}.

Embodiment 4

In this embodiment, the candidate CSI-RS resource patterns transmitted on the DwPTS at least include resource patterns for a third-type CSI-RS transmission scenario.

For example, the candidate CSI-RS resource patterns transmitted on the DwPTS with a configuration of {1,2,3,5,6,7} may be located on the OFDM symbol with a sequence number of {4,5}.

Embodiment 5

In this embodiment, the candidate CSI-RS resource patterns transmitted on the DwPTS at least include resource patterns for a fourth-type CSI-RS transmission scenario.

For example, the candidate CSI-RS resource patterns transmitted on the DwPTS with a configuration of {1,2,3,5,6,7} may be located on the OFDM symbol with a sequence number of {4,5}.

Embodiment 6

In this embodiment, when the CSI-RS subframe configuration is a CSI-RS subframe configuration in which a CSI-RS is transmitted on both the DwPTS and the downlink normal subframe, the CSI-RS resource pattern information indicates both CSI-RS resource patterns transmitted on a DwPTS and CSI-RS resource patterns transmitted on a downlink normal subframe.

For example, the period of the DwPTS is 10 ms, and the CSI-RS subframe configuration is transmission on DwPTS with a period of 5 ms, so that it requires that the CSI-RS is transmitted on the downlink normal subframe. The CSI-RS resource pattern information indicates both CSI-RS resource patterns transmitted on a DwPTS and CSI-RS resource patterns transmitted on a downlink normal subframe.

Embodiment 7

In this embodiment, each candidate CSI-RS resource pattern transmitted on the DwPTS has a corresponding candidate CSI-RS resource pattern transmitted on the downlink normal subframe, and when the CSI-RS subframe configuration is transmitted on both DwPTS and downlink normal subframe, information of the CSI-RS resource configuration patterns indicates both CSI-RS resource patterns transmitted on a DwPTS and corresponding CSI-RS resource patterns transmitted on the downlink normal subframe.

For example, under the first-type CSI-RS transmission scenario, the candidate CSI-RS resource patterns transmitted on the DwPTS with a configuration of {3,4,8,9} have a one-to-one correspondence with the candidate CSI-RS resource patterns of the downlink normal subframe. In another example, under the second-type CSI-RS transmission scenario, the candidate CSI-RS resource patterns transmitted on the DwPTS with a configuration of {3,4,8,9} have a one-to-one correspondence with the candidate CSI-RS resource patterns of the downlink normal subframe. In a further example, under the first-type CSI-RS transmission scenario, the candidate CSI-RS resource patterns transmitted on the DwPTS with a configuration of {1,2,6,7} have a one-to-one correspondence with a part of the candidate CSI-RS resource patterns of the downlink normal subframe.

Embodiment 8

In this embodiment, for the first-type CSI-RS transmission scenario, the candidate CSI-RS resource patterns of the DwPTS with a special subframe configuration of {3,4,8,9} have a one-to-one correspondence with the candidate CSI-RS resource patterns of the downlink normal subframe.

For example, the OFDM symbol sequence number {2,3,5,6,9,10} of the DwPTS with a special subframe configuration of {3,4,8,9} that is configured to transmit a CSI-RS has a one-to-one correspondence with the OFDM symbol sequence number {5,6,9,10,11,12} of the downlink normal subframe that is configured to transmit a CSI-RS, and the candidate CSI-RS resource patterns thereon have a one-to-one correspondence.

Embodiment 9

In this embodiment, for the first-type CSI-RS transmission scenario, the candidate CSI-RS resource patterns of the DwPTS with a special subframe configuration of {1,2,6,7} have a one-to-one correspondence with a part of the candidate CSI-RS resource patterns of the downlink normal subframe.

For example, the OFDM symbol sequence number {2,3,5,6} of the DwPTS with a special subframe configuration of {1,2,6,7} that is configured to transmit a CSI-RS has a one-to-one correspondence with the OFDM symbol sequence number {5,6,9,10} of the downlink normal subframe that is configured to transmit a CSI-RS, and the candidate CSI-RS resource patterns thereon have a one-to-one correspondence.

Embodiment 10

In this embodiment, for the second-type CSI-RS transmission scenario, the candidate CSI-RS resource patterns of the DwPTS with a special subframe configuration of {3,4,8,9} have a one-to-one correspondence with the candidate CSI-RS resource patterns of the downlink normal subframe.

For example, the OFDM symbol sequence number {8,10} of the DwPTS with a special subframe configuration of {3,4,8,9} that is configured to transmit a CSI-RS has a one-to-one correspondence with the OFDM symbol sequence number {8,10} of the downlink normal subframe that is configured to transmit a CSI-RS, and the candidate CSI-RS resource patterns thereon have a one-to-one correspondence.

Embodiment 11

In this embodiment, for the second-type CSI-RS transmission scenario, the candidate CSI-RS resource patterns of the DwPTS with a special subframe configuration of {1,2,6,7} have a one-to-one correspondence with the candidate CSI-RS resource patterns of the downlink normal subframe.

For example, the OFDM symbol sequence number {2,5} of the DwPTS with a special subframe configuration of {1,2,6,7} that is configured to transmit a CSI-RS has a one-to-one correspondence with the OFDM symbol sequence number {8,10} of the downlink normal subframe that is configured to transmit a CSI-RS, and the candidate CSI-RS resource patterns thereon have a one-to-one correspondence. Or, the OFDM symbol sequence number {5, 8} of the DwPTS with a special subframe configuration of {1,2,6,7} that is configured to transmit a CSI-RS has a one-to-one correspondence with the OFDM symbol sequence number {8,10} of the downlink normal subframe that is configured to transmit a CSI-RS, and the candidate CSI-RS resource patterns thereon have a one-to-one correspondence.

Embodiment 12

In this embodiment, for the third-type CSI-RS transmission scenario, the candidate CSI-RS resource patterns of the DwPTS with a special subframe configuration of {1,2,3,5,6,7} have a one-to-one correspondence with a part of the candidate CSI-RS resource patterns of the downlink normal subframe.

For example, the OFDM symbol sequence number {4,5} of the DwPTS with a special subframe configuration of {1,2,3,5,6,7} that is configured to transmit a CSI-RS has a one-to-one correspondence with the OFDM symbol sequence number {4,5} of the downlink normal subframe that is configured to transmit a CSI-RS, and the candidate CSI-RS resource patterns thereon have a one-to-one correspondence.

Embodiment 13

In this embodiment, for the fourth-type CSI-RS transmission scenario, the candidate CSI-RS resource patterns of the DwPTS with a special subframe configuration of {1,2,3,5,6,7} have a one-to-one correspondence with a part of the candidate CSI-RS resource patterns of the downlink normal subframe.

For example, the OFDM symbol sequence number {4,5} of the DwPTS with a special subframe configuration of {1,2,3,5,6,7} that is configured to transmit a CSI-RS has a one-to-one correspondence with the OFDM symbol sequence number {4,5} of the downlink normal subframe that is configured to transmit a CSI-RS, and the candidate CSI-RS resource pattern thereon has a one-to-one correspondence with a part of the candidate CSI-RS resource pattern of the downlink normal subframe.

Embodiment 14

In this embodiment, the candidate CSI-RS resource patterns transmitted on the DwPTS with a special subframe configuration of {1,2,3,5,6,7} are the same in the following two scenarios: the third-type CSI-RS transmission scenario, and the fourth-type CSI-RS transmission scenario.

For example, under the third-type CSI-RS transmission scenario, the DwPTS with a special subframe configuration of {1,2,3,5,6,7} is configured to transmit the OFDM symbol sequence number {4,5} of the CSI-RS; and under the fourth-type CSI-RS transmission scenario, the DwPTS with a special subframe configuration of {1,2,3,5,6,7} is configured to transmit the OFDM symbol sequence number {4,5} of the CSI-RS. Moreover, the candidate reference signal patterns thereof are the same.

With the description of the above embodiments, one skilled in the art may clearly understand that the method according to the above embodiments may be implemented by the aid of software and necessary universal hardware; of course, the invention may be implemented by hardware. However, in many cases, the former is preferred. Based on such an understanding, the essential part of the solutions of the disclosure, or in other words, the part that contributes to the prior art, may be embodied in the form of a software product that is stored in a computer-readable storage medium (for example, ROM/RAM, magnetic disk or compact disc, etc.), and includes several instructions that can make a user equipment (which may be a mobile phone, a server or a network device, etc.) implement the method according to various embodiments of the disclosure.

It should be noted that each of the above modules may be implemented via software or hardware; for the latter, it may be realized in the following modes, without limitation: all the above modules are located in the same processor; or, the above modules are located in a plurality of processors respectively.

One embodiment of the disclosure further provides a storage medium. Alternatively, in this embodiment, the above storage medium may be configured to store program codes for performing the method steps of the above embodiments.

One embodiment of the disclosure further provides a storage medium. Alternatively, in this embodiment, the above storage medium may be configured to store program codes for performing the steps below:

S1: A base station generates a signaling including configuration information of a CSI-RS.

S2: The base station transmits the signaling including the configuration information of the CSI-RS.

The configuration information includes: a CSI-RS port number, a CSI-RS resource pattern and a CSI-RS subframe configuration.

The CSI-RS resource pattern includes at least one of: a CSI-RS resource pattern transmitted on a downlink normal subframe; a CSI-RS resource pattern transmitted on a downlink pilot time slot (DwPTS); and a CSI-RS subframe configuration transmitted on both the DwPTS and the downlink normal subframe.

Alternatively, in this embodiment, the above storage medium may include, but not be limited to, various media on which program codes may be stored, for example, USB flash disk, Read-Only Memory (ROM), Random Access Memory (RAM), mobile hard disk, magnetic disk or compact disk, etc.

Alternatively, in this embodiment, the processor performs the method steps of the above embodiments according to the program codes stored on the storage medium.

Apparently, it should be understood by one skilled in the art that, each of the above modules or steps of the disclosure may be implemented via a universal computing device, and the above modules or steps may be centralized on a single computing device or distributed on a network consisted of a plurality of computing devices. Alternatively, they may be implemented via computing device-executable program codes, thus they may be stored on a storage device and executed by a computing device; moreover, in certain cases, the steps shown or described may be performed in a different order, or they may be made into an IC module respectively, or a plurality of modules or steps thereof may be made into a single IC module. Thus, the disclosure is not limited to any specific combination of hardware and software.

The above description only shows some preferred embodiments of the invention, rather than limiting the scope of the invention. For one skilled in the art, various modifications and variations may be made to the disclosure. All modifications, equivalent substitutions and improvements made without departing from the spirit and principles of the disclosure should be contemplated by the protection scope of the invention.

INDUSTRIAL APPLICABILITY

In the embodiments of the disclosure, a base station generates a signaling including configuration information of a CSI-RS, and the base station transmits the signaling including the configuration information of the CSI-RS, and the configuration information includes: a CSI-RS port number, a CSI-RS resource pattern and a CSI-RS subframe configuration, and the CSI-RS resource pattern includes at least one of: a CSI-RS resource pattern transmitted on a downlink normal subframe, or a CSI-RS resource pattern transmitted on a downlink pilot time slot (DwPTS). Therefore, the complicated problem of transmitting CSI-RS on DwPTS in a CSI-RS transmission scenario may be solved, and the complexity of transmitting CSI-RS on DwPTS may be reduced.

What is claimed is:

1. A method of configuring a channel state information-reference signal (CSI-RS), comprising:
   generating, by a base station, a signaling comprising configuration information of a CSI-RS; and
   transmitting, by the base station, the signaling comprising the configuration information of the CSI-RS, wherein the configuration information comprises a CSI-RS port number, CSI-RS resource patterns and a CSI-RS subframe configuration;
   wherein the CSI-RS resource patterns comprise at least one of: CSI-RS resource patterns transmitted on a downlink normal subframe, or CSI-RS resource patterns transmitted on a downlink pilot time slot (DwPTS); and
   the CSI-RS subframe configuration comprises: a CSI-RS subframe configuration in which the CSI-RS is transmitted on both the DwPTS and the downlink normal subframe.

2. The method according to claim 1, wherein
   when the CSI-RS subframe configuration is a CSI-RS subframe configuration in which the CSI-RS is transmitted on both the DwPTS and the downlink normal subframe, information of the CSI-RS resource patterns indicates both the CSI-RS resource patterns transmitted on the DwPTS and the CSI-RS resource patterns transmitted on the downlink normal subframe.

3. The method according to claim 1, wherein
   each of CSI-RS resource patterns transmitted on the DwPTS has corresponding one of CSI-RS resource patterns transmitted on the downlink normal subframe; and
   when the CSI-RS subframe configuration is a CSI-RS subframe configuration in which the CSI-RS is transmitted on both the DwPTS and the downlink normal subframe, information of the CSI-RS resource patterns indicates both the CSI-RS resource patterns transmitted on the DwPTS and the CSI-RS resource patterns transmitted on the downlink normal subframe that correspond to the CSI-RS resource patterns transmitted on the DwPTS.

4. The method according to claim 3, wherein
   the information of the CSI-RS resource configuration patterns is indexes of the CSI-RS resource patterns transmitted on the downlink normal subframe.

5. The method according to claim 3, wherein
   each of the CSI-RS resource patterns transmitted on the DwPTS having the corresponding one of the CSI-RS resource patterns transmitted on the downlink normal subframe comprises one of followings that:
   in a first-type CSI-RS transmission scenario, the CSI-RS resource patterns on the DwPTS with a special subframe configuration of {3,4,8,9} have a one-to-one correspondence with the CSI-RS resource patterns of the downlink normal subframe;
   in the first-type CSI-RS transmission scenario, the CSI-RS resource patterns on the DwPTS with a special subframe configuration of {1,2,6,7} have a one-to-one correspondence with a part of the CSI-RS resource patterns of the downlink normal subframe;
   in a second-type CSI-RS transmission scenario, the CSI-RS resource patterns on the DwPTS with a special subframe configuration of {3,4,8,9} have a one-to-one correspondence with the CSI-RS resource patterns of the downlink normal subframe;
   in the second-type CSI-RS transmission scenario, the CSI-RS resource patterns on the DwPTS with a special subframe configuration of {1,2,6,7} have a one-to-one correspondence with the CSI-RS resource patterns of the downlink normal subframe;
   in a third-type CSI-RS transmission scenario, the CSI-RS resource patterns of the DwPTS with a special subframe configuration of {1,2,3,5,6,7} have a one-to-one correspondence with a part of the CSI-RS resource patterns of the downlink normal subframe; or
   in a fourth-type CSI-RS transmission scenario, the CSI-RS resource patterns of the DwPTS with a special subframe configuration of {1,2,3,5,6,7} have a one-to-one correspondence with a part of candidate CSI-RS resource patterns of the downlink normal subframe.

6. The method according to claim 5, wherein
   each of the CSI-RS resource patterns transmitted on the DwPTS has the same index as the corresponding one of the CSI-RS resource patterns transmitted on the downlink normal subframe.

7. The method according to claim 5, wherein
   each of the CSI-RS resource patterns transmitted on the DwPTS and the corresponding one of the CSI-RS resource patterns transmitted on the downlink normal subframe have different resource element RE positions, wherein the different resource element RE positions comprise different positions of orthogonal frequency division multiplex OFDM symbols at which the RE is located or different positions of subcarriers at which the RE is located.

8. The method according to claim 1, wherein
   the CSI-RS resource patterns transmitted on the DwPTS in a third-type CSI-RS transmission scenario are the same as the CSI-RS resource patterns transmitted on the DwPTS in a fourth-type CSI-RS transmission scenario; and
   wherein the CSI-RS resource patterns transmitted on the DwPTS in the third-type CSI-RS transmission scenario have different indexes from said CSI-RS resource patterns transmitted on the DwPTS in the fourth-type CSI-RS transmission scenario.

9. A device for configuring a channel state information-reference signal (CSI-RS), which is located in a base station, wherein the device comprises a processor and a storage device, wherein the storage device stores programs executable on the processor that comprise:
   a generation module, configured to generate a signaling comprising configuration information of a CSI-RS; and
   a transmission module, configured to transmit the signaling comprising the configuration information of the CSI-RS, wherein the configuration information comprises a CSI-RS port number, CSI-RS resource patterns and a CSI-RS subframe configuration;

wherein the CSI-RS resource patterns comprise at least one of: CSI-RS resource patterns transmitted on a downlink normal subframe, or CSI-RS resource patterns transmitted on a downlink pilot time slot (DwPTS); and the CSI-RS subframe configuration comprises: a CSI-RS subframe configuration in which the CSI-RS is transmitted on both the DwPTS and the downlink normal subframe.

10. The device according to claim 9, wherein when the CSI-RS subframe configuration is a CSI-RS subframe configuration in which a CSI-RS is transmitted on both the DwPTS and the downlink normal subframe, information of the CSI-RS resource patterns indicates both the CSI-RS resource patterns transmitted on the DwPTS and the CSI-RS resource patterns transmitted on the downlink normal subframe.

11. The device according to claim 9, wherein each of CSI-RS resource patterns transmitted on the DwPTS has the corresponding one of CSI-RS resource patterns transmitted on the downlink normal subframe; and when the CSI-RS subframe configuration is a CSI-RS subframe configuration in which a CSI-RS is transmitted on both the DwPTS and the downlink normal subframe, information of the CSI-RS resource patterns information indicates both the CSI-RS resource patterns transmitted on the DwPTS and the CSI-RS resource patterns transmitted on the downlink normal subframe that corresponds to the CSI-RS resource patterns transmitted on the DwPTS.

12. The device according to claim 11, wherein the information of the CSI-RS resource configuration pattern is indexes of the CSI-RS resource patterns transmitted on the downlink normal subframe.

13. The device according to claim 11, wherein, each of the CSI-RS resource patterns transmitted on the DwPTS having the corresponding one of the CSI-RS resource patterns transmitted on the downlink normal subframe comprises one of following that:

in a first-type CSI-RS transmission scenario, the CSI-RS resource patterns on the DwPTS with a special subframe configuration of {3,4,8,9} has a one-to-one correspondence with the CSI-RS resource patterns of the downlink normal subframe;

in the first-type CSI-RS transmission scenario, the CSI-RS resource patterns on the DwPTS with a special subframe configuration of {1,2,6,7} has a one-to-one correspondence with a part of the CSI-RS resource patterns of the downlink normal subframe;

in a second-type CSI-RS transmission scenario, the CSI-RS resource patterns on the DwPTS with a special subframe configuration of {3,4,8,9} has a one-to-one correspondence with the CSI-RS resource patterns of the downlink normal subframe;

in the second-type CSI-RS transmission scenario, the CSI-RS resource patterns on the DwPTS with a special subframe configuration of {1,2,6,7} has a one-to-one correspondence with the CSI-RS resource patterns of the downlink normal subframe;

in a third-type CSI-RS transmission scenario, the CSI-RS resource patterns on the DwPTS with a special subframe configuration of {1,2,3,5,6,7} has a one-to-one correspondence with a part of the CSI-RS resource patterns of the downlink normal subframe; or in a fourth-type CSI-RS transmission scenario, the CSI-RS resource patterns on the DwPTS with a special subframe configuration of {1,2,3,5,6,7} has a one-to-one correspondence with a part of candidate CSI-RS resource patterns of the downlink normal subframe.

14. The device according to claim 13, wherein each of the CSI-RS resource patterns transmitted on the DwPTS has the same index as the corresponding one of the CSI-RS resource patterns transmitted on the downlink normal subframe.

15. The device according to claim 9, wherein the CSI-RS resource patterns transmitted on the DwPTS in a third-type CSI-RS transmission scenario are the same as the CSI-RS resource patterns transmitted on the DwPTS in a fourth-type CSI-RS transmission scenario.

16. The device according to claim 15, wherein each of the CSI-RS resource patterns transmitted on the DwPTS and the corresponding one of the CSI-RS resource patterns transmitted on the downlink normal subframe have different resource element RE positions, wherein the different resource element RE positions comprise different positions of orthogonal frequency division multiplex OFDM symbols at which the RE is located or different positions of subcarriers at which the RE is located; and wherein the CSI-RS resource patterns transmitted on the DwPTS in the third-type CSI-RS transmission scenario have different indexes from said CSI-RS resource patterns transmitted on the DwPTS in the fourth-type CSI-RS transmission scenario.

17. A non-transitory computer-readable storage medium, storing computer-executable instructions, which, when executed by a processor, causes the processor to implement steps of:

generating, by a base station, a signaling comprising configuration information of a CSI-RS; and transmitting, by the base station, the signaling comprising the configuration information of the CSI-RS, wherein the configuration information comprises a CSI-RS port number, CSI-RS resource patterns and a CSI-RS subframe configuration;

wherein the CSI-RS resource patterns comprise at least one of: CSI-RS resource patterns transmitted on a downlink normal subframe, or CSI-RS resource patterns transmitted on a downlink pilot time slot (DwPTS); and the CSI-RS subframe configuration comprises: a CSI-RS subframe configuration in which the CSI-RS is transmitted on both the DwPTS and the downlink normal subframe.

18. The storage medium according to claim 17, wherein when the CSI-RS subframe configuration is a CSI-RS subframe configuration in which the CSI-RS is transmitted on both the DwPTS and the downlink normal subframe, information of the CSI-RS resource patterns indicates both the CSI-RS resource patterns transmitted on the DwPTS and the CSI-RS resource patterns transmitted on the downlink normal subframe.

19. The storage medium according to claim 17, wherein each of CSI-RS resource patterns transmitted on the DwPTS has corresponding one of CSI-RS resource patterns transmitted on the downlink normal subframe; and when the CSI-RS subframe configuration is a CSI-RS subframe configuration in which the CSI-RS is transmitted on both the DwPTS and the downlink normal subframe, information of the CSI-RS resource patterns indicates both the CSI-RS resource patterns transmitted on the DwPTS and the CSI-RS resource patterns transmitted on the downlink normal subframe that correspond to the CSI-RS resource patterns transmitted on the DwPTS.

20. The storage medium according to claim 19, wherein the information of the CSI-RS resource configuration patterns is indexes of the CSI-RS resource patterns transmitted on the downlink normal subframe.

* * * * *